Patented Aug. 29, 1933

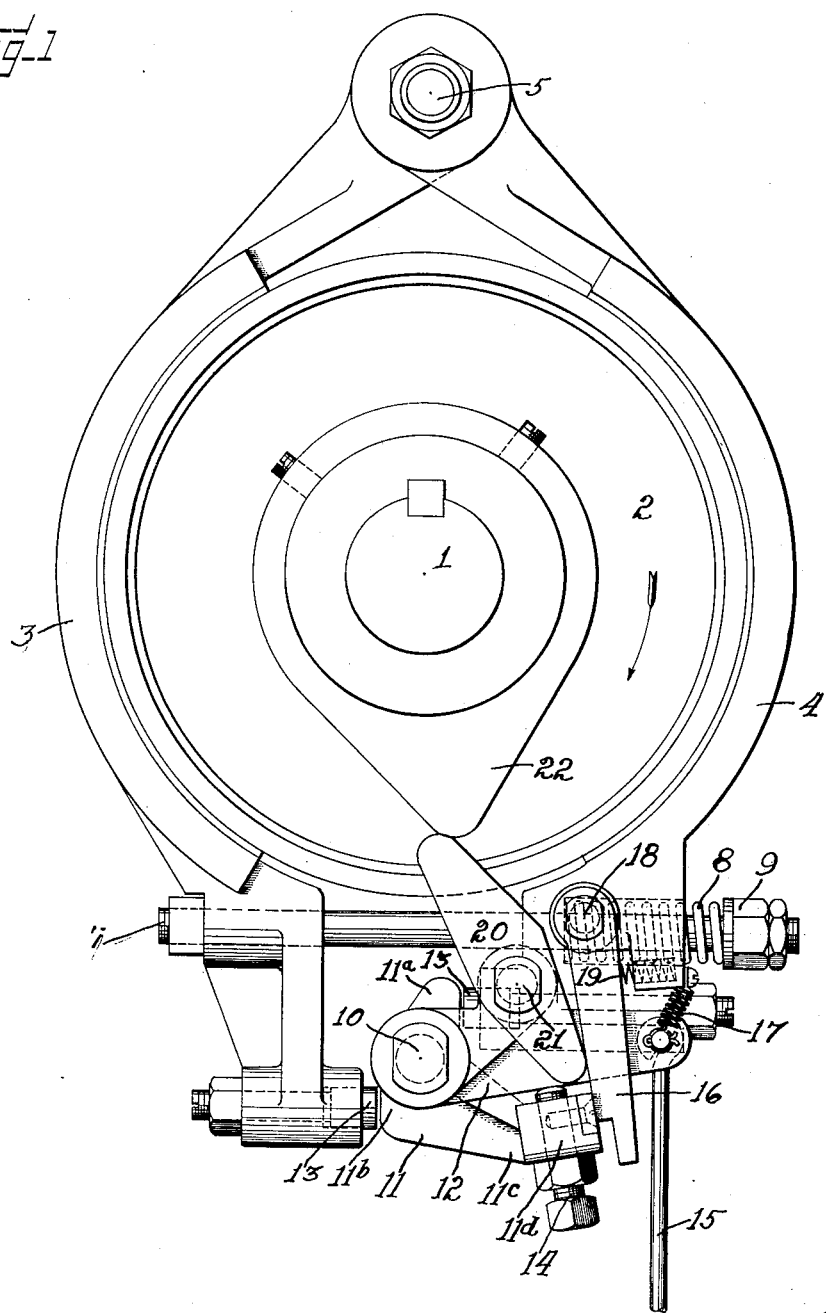

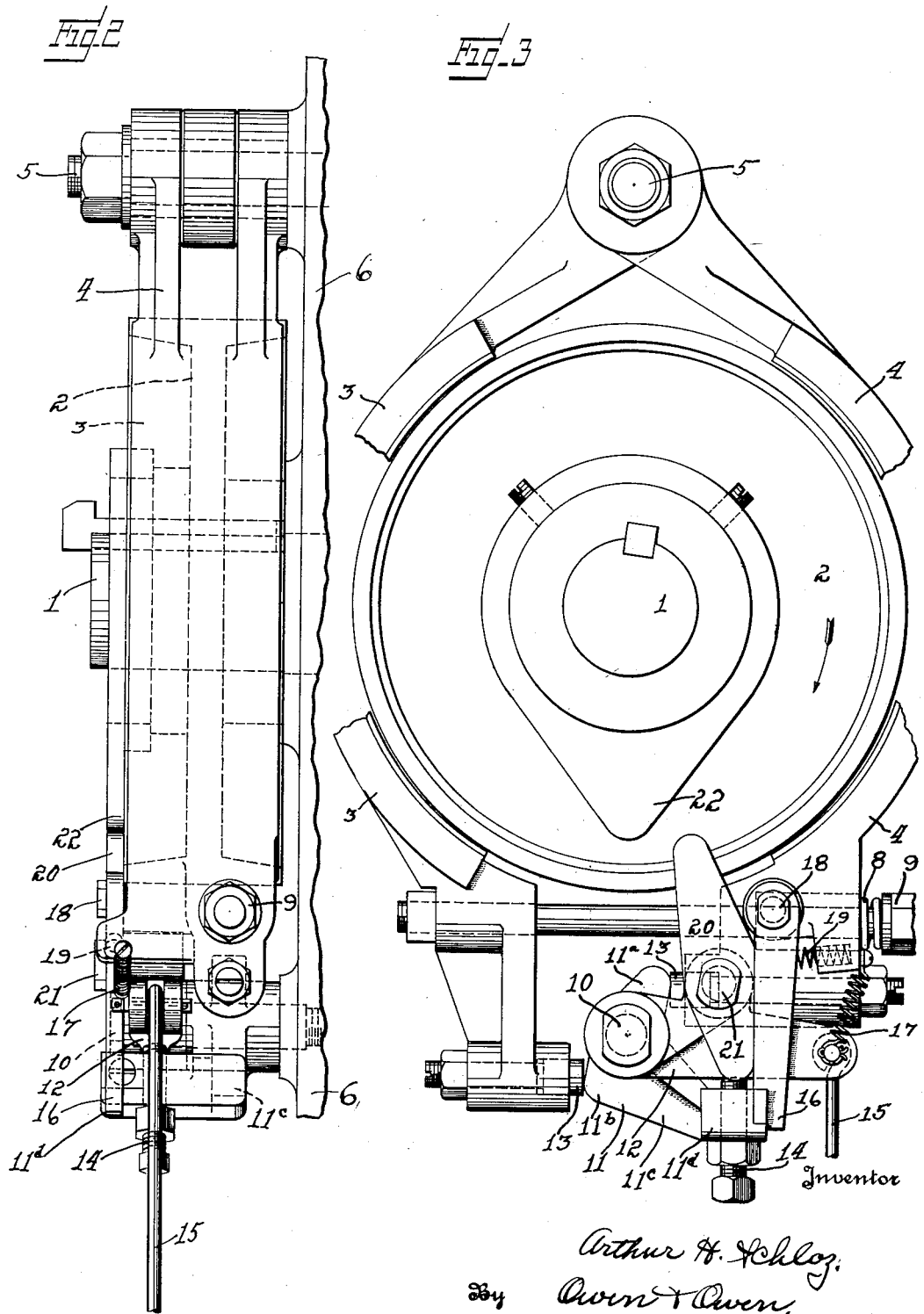

1,924,808

UNITED STATES PATENT OFFICE 1,924,808

BRAKE CONTROL MECHANISM

Arthur H. Schloz, Toledo, Ohio, assignor to The Toledo Machine & Tool Company, Toledo, Ohio, a corporation of Ohio Application November 24, 1930
Serial No. 497,672

9 Claims. (Cl. 188—77)

This invention relates to brakes, particularly of the type desirable for use on high-speed power presses where quick release and application of the brake for permitting sudden starting and stopping of the press at the beginning and end of each cycle of operations, or when desired by the operator.

An object of the invention is the provision of a brake mechanism of this character which is simple and highly efficient in its operation and construction, is rapid in its action and automatically operable to apply the brake at a predetermined point in a cycle of operations.

The invention is fully described in the following specification, and while in its broader aspect it is capable of embodiment in different forms, one embodiment thereof is illustrated in the accompanying drawings in which—

Figure 1 is an elevation of a brake mechanism embodying the invention in operative engaged relation to a brake-drum. Fig. 2 is an edge-elevation thereof, with a press frame to which it is attached, fragmentarily shown, and Fig. 3 is a view similar to Fig. 1 with the parts in brake-releasing position and with parts broken away.

Referring to the drawings, 1 designates a driven shaft to which the brake is applied, 2 a brake-drum attached thereto, and 3, 4, two opposed brake-levers pivoted, in the present instance, at their upper ends, to a stud 5 projecting from the associated machine frame 6. The levers 3, 4 extend down around the drum 2 at opposite sides thereof, and have arcuate portions conforming to and adapted to have braking engagement with the respective sides of the drum, and have their free ends extending below the drum, one a greater distance than the other.

The free ends of the levers 3, 4 are connected near the drum with a tension-bolt 7, which projects loosely through one lever at least, and is encircled by an expansion spring 8 acting against such lever and against a tension-adjusting nut 9 on the bolt to normally hold the levers in braking engagement with the drum.

A bearing stud 10 projects from the frame 6 intermediate the free ends of the levers 3, 4, and has a pressure-lever 11 and a control-lever 12 fulcrumed thereon for relative rocking movements. The lever 11 has oppositely projecting arms 11ª, and 11ᵇ for respective thrust engagement with the inner sides of the free end portions of the brake levers 3, 4, to impart a relative expanding or brake-drum releasing movement thereto when the pressure lever 11 is rocked in one direction. In the present instance, the lever 11 contacts with studs 13, set into the levers 3, 4, and adjustable relative thereto to compensate for wear or other purposes.

The arm 11ᵇ of the lever 11 is of elbow form and has its forearm portion 11ᶜ projecting under the free end of the lever 4 and provided at its free end with a head or cross-piece 11ᵈ.

The control-lever 12 projects substantially horizontally from its fulcrumed stud over and beyond the head or cross-piece 11ᵈ of the lever 11 and is adapted, when rocked downward, to co-act with a stop screw 14, projecting upwardly from said head, to communicate a brake-lever expanding movement to the lever 11. A rod 15 connects the free end of the lever 12 to any suitable operating member, such for instance, as the foot-control treadle of a power press.

When the lever 11 has been rocked a predetermined extent by a downward movement of the control-lever 12 the catch-dog 16 moves into catch-engagement with an edge of the head 11ᵈ and retains the lever 11 in such position after the control-lever has returned to its normal raised position by the action of the control-means to which connected. In the present instance, 17 indicates a spring for normally retaining the control lever in its elevated position, shown in Fig. 1, such spring being shown as connecting the free end of the lever 12 to the adjacent free end of the brake-lever 4. In practice, the functioning of the spring 17 is usually performed by the customary treadle spring of the associated press. The dog 16 is hung from a pivot 18, projecting from a side of the free end portion of the lever 4, and is acted on by a spring 19 to cause it to normally move into catch engagement with the head 11ᵈ.

A trip-lever 20 is fulcrumed at 21 to a side of the lever 12, intermediate its ends and has its upper end normally disposed in the path of movement of a striker-cam 22 on the shaft 1, and its lower end in engagement with the inner edge of the catch-dog 16, so that when the trip-lever is rocked, by striking engagement therewith of the cam 22, the catch-engagement of the dog 16 with the lever 11 is released. Such release of the lever 11 permits a sudden engagement of the brake levers with the brake-drum as is apparent.

In presses or machines of the character in connection with which this brake mechanism is used, it is customary to interpose a control clutch intermediate the driven shaft 1, and the drive means, and to have the control for the clutch so connected with the control for the brake, that an operation of the control mechanism to release the brake, effects an engagement of the clutch mechanism and vice versa. Inasmuch as the dependent relationship of the clutch and brake mechanisms of power presses and the like is well understood in the art, and further for the reason that the present invention resides wholly in the brake-control mechanism, the connection of such brake control mechanism with the clutch-control mechanism has not been shown.

It will be understood that when the control treadle of a power press equipped with the present invention is depressed, the control lever 12 will be lowered, effecting a rocking of the pressure lever 11 to cause a relative outward movement of the two brake-levers 3, 4, and a consequent release of the brake-drum, and at approximately the same time the associated clutch mechanism, not shown, will be operated to throw the clutch into engagement. When the pressure lever 11 has been rocked to release the brake, the catch-dog 16 moves into catch engagement with the head portion of the lever 11 and retains such lever in brake-releasing position. The press now continues to operate until the striker-cam 22 has substantially completed a revolution when it will strike the upper end of the trip-lever 20 and cause a rocking of such lever to disengage the catch-dog 16 from the lever 11, thereby permitting a quick return of the brake levers 3, 4 to brake-drum engaging position and effecting a sudden stopping of the rotation of the shaft 1.

It is apparent that I have provided a simple and efficient control mechanism for the brake, which mechanism is composed of few parts in compact arrangement, and is manually operable in a way to effect a release of the brake, and is automatically operable to permit an engagement of the brake at the end of a cycle of operations.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a brake mechanism, a rotatable member, opposing brake members operable to normally have braking engagement with said rotatable member, pressure means operable to release said brake members from said rotatable member, catch means automatically operable to engage said pressure means when in brake releasing position, and hold it in such position, a control lever manually operable to move said pressure means to brake releasing position, and means automatically operable at a predetermined point in a cycle of forward movement of said rotatable member to release said catch means from said pressure means.

2. In a brake mechanism, a rotatable member, opposing brake members operable to normally have braking engagement with said rotatable member, a pressure lever operable to release said brake members from said rotatable member, catch means automatically operable to engage said lever when in brake releasing position and hold it in such position, control means manually operable to move said lever to brake releasing position, and means automatically operable at a predetermined point in a cycle of forward movement of said rotatable member to release the catch means from said lever and having a member which is movable from operative position by a lever releasing movement of said control means.

3. In a brake mechanism, a rotatable member, opposing brake members operable to normally have braking engagement with said rotatable member, a striker element rotatable when said first member rotates, a pressure means operative to release said brake members from said first member, catch means automatically operable to engage said pressure means when in brake releasing position and hold it in such position, control means manually operable to move said pressure means to brake releasing position, and means automatically operable by said striker element at a predetermined point in a cycle of movement of said rotatable member to release the catch means from said pressure means.

4. In a brake mechanism, a rotatable member, opposing brake members operable to normally have braking engagement with said rotatable member, pressure means operable to release said brake members from said rotatable member, catch means automatically operable to engage said pressure means when in brake releasing position and hold it in such position, control means manually operable to move said pressure means to brake releasing position, a trip means automatically operable at a predetermined point in a cycle of movement of said rotatable member to release the catch means from said pressure means, said trip means including a part movable with said rotatable member and a part carried by said control means.

5. In a brake mechanism, a rotatable member, opposing members operable to normally have braking engagement with said rotatable member, a pressure lever operable to release said brake members from said rotatable member, catch means automatically operable to engage said lever when in brake releasing position and hold it in such position, a control lever operable to move said pressure lever to brake releasing position and then to return to normal position, and means having a part carried by said control lever, and automatically operable at a predetermined point in a cycle of movement of said rotatable member to release the catch means from said pressure lever.

6. In a brake mechanism, a rotatable member, opposing brake members operable to normally have braking engagement with said rotatable member, a pressure lever operable to release said brake members from said rotatable member, catch means automatically operable to engage said lever when in brake releasing position and hold it in such position, a control lever having a common fulcrum wtih said pressure lever for movements relative thereto and manually operable from normal position to move said pressure lever to brake releasing position, and means automatically operable at a predetermined point in a cycle of movement of said rotatable member to release the catch means from said pressure lever and including a trip member carried by said control lever, which member is movable out of operative position when the control lever is moved from normal position.

7. In a brake mechanism, a rotatable member, opposing brake elements operable to normally have braking engagement with said rotatable member, a striker element rotatable when said rotatable member rotates, a pressure lever operable to release said brake members from said rotatable member, catch means automatically operable to engage said lever when in brake releasing position and hold it in such position, a control lever normally standing in one position and manually operable to move said pressure lever to brake releasing position and then return to normal position relative to the pressure lever, and a trip lever carried by said control lever and operable by said striker element to release the catch means from said pressure lever at a predetermined point in a cycle of movement of said rotatable member and when the control lever is in normal position.

8. In a brake mechanism, a rotatable member, opposing brake elements operable to normally have braking engagement with said rotatable member, a striker element carried by said rotatable member, a pivoted pressure lever operable to release said brake members from said rotatable member, catch means automatically operable to engage said lever when in brake releasing position and hold it in such position, a control lever normally standing in one position and manually operable to move said pressure lever to brake releasing position, and a trip lever carried by said control lever and operable by said striker element to release the catch means from said pressure lever at a predetermined point in a cycle of movement of said rotatable member and when the control lever is in normal position.

9. In a brake mechanism, a rotatable member, opposing brake elements operable to normally have braking engagement with said rotatable member, a striker element rotatable when said rotatable member rotates, a pressure lever operable to release said brake members from said rotatable member, catch means carried by one of said brake members and having parts adapted to automatically engage said lever when in brake releasing position and hold it in such position, a control lever normally standing in one position and manually operable to move said pressure lever to brake releasing position, and a trip lever carried by said control lever and operable by said striker element to release the catch means from said pressure lever at a predetermined point in a cycle of movement of said rotatable member and when the control lever is in normal position.

ARTHUR H. SCHLOZ.